(12) United States Patent
Dhalla et al.

(10) Patent No.: US 12,527,475 B2
(45) Date of Patent: Jan. 20, 2026

(54) HYBRID SPIRAL SCAN PATTERNS

(71) Applicant: DUKE UNIVERSITY, Durham, NC (US)

(72) Inventors: Al-Hafeez Z. Dhalla, Durham, NC (US); Franklin Wei, Durham, NC (US); Anthony N. Kuo, Durham, NC (US); Jianwei D. Li, Durham, NC (US); Joseph A. Izatt, Durham, NC (US)

(73) Assignee: DUKE UNIVERSITY, Durham, NC (US)

( * ) Notice: Subject to any disclaimer, the term of this patent is extended or adjusted under 35 U.S.C. 154(b) by 471 days.

(21) Appl. No.: 18/020,784

(22) PCT Filed: Aug. 11, 2021

(86) PCT No.: PCT/US2021/045614
§ 371 (c)(1),
(2) Date: Feb. 10, 2023

(87) PCT Pub. No.: WO2022/036008
PCT Pub. Date: Feb. 17, 2022

(65) Prior Publication Data
US 2023/0301513 A1 Sep. 28, 2023

Related U.S. Application Data

(60) Provisional application No. 63/063,994, filed on Aug. 11, 2020.

(51) Int. Cl.
*A61B 3/14* (2006.01)
*A61B 3/00* (2006.01)
(Continued)

(52) U.S. Cl.
CPC .............. *A61B 3/14* (2013.01); *A61B 3/0025* (2013.01); *A61B 3/102* (2013.01); *A61B 3/1025* (2013.01);
(Continued)

(58) Field of Classification Search
CPC ......... A61B 3/14; A61B 3/0025; A61B 3/102; A61B 3/1025; G02B 21/0048; G02B 21/0076
(Continued)

(56) References Cited

U.S. PATENT DOCUMENTS 4,746,916 A      5/1988  Sanbe
2004/0037181 A1* 2/2004  Jin ................... G11B 7/08517
                                                              369/53.29

(Continued)

OTHER PUBLICATIONS

Chen, Yiwei et al., "Three-dimensional eye motion correction by Lissajous scan optical coherence tomography," Biomedical Optics Express, Mar. 1, 2017 (accessible Feb. 23, 2017), p. 1783-1802, vol. 8, issue 3.

(Continued)

*Primary Examiner* — Mohammed A Hasan
(74) *Attorney, Agent, or Firm* — Talem IP Law, LLP

(57) ABSTRACT

An imaging system for performing a hybrid spiral scan pattern includes scanner, a scanner controller in communication with the scanner to direct the scanner to perform a hybrid spiral scan pattern. When the hybrid spiral scan pattern includes a constant angular velocity (CAV) spiral scan pattern, a constant linear velocity (CLV) spiral scan pattern, and a transition spiral scan pattern. In some cases, the imaging system further includes a light source, and the scanner is positioned to receive light from the light source and direct the light to an object. In some cases, the imaging system further includes at least one position sensor for detecting actual positions of the scanner during the hybrid (Continued)

spiral scan pattern. In some cases, the imaging system further includes an image processor coupled to receive position data detected by at least one position sensor and produce an image.

35 Claims, 6 Drawing Sheets

(51) Int. Cl.
*A61B 3/10* (2006.01)
*G02B 21/00* (2006.01)

(52) U.S. Cl.
CPC ..... *G02B 21/0048* (2013.01); *G02B 21/0076* (2013.01)

(58) Field of Classification Search
USPC ......................................................... 351/205
See application file for complete search history.

(56) References Cited

U.S. PATENT DOCUMENTS

2004/0091817 A1 5/2004 Komatsu et al.
2004/0151345 A1* 8/2004 Morcom ............... G01S 17/894
382/104
2004/0252295 A1 12/2004 Miyakawa et al.
2004/0254474 A1* 12/2004 Seibel ................ G02B 21/0036
600/478
2017/0371142 A1* 12/2017 Anthony .................. H04N 1/00

OTHER PUBLICATIONS

Carrasco-Zevallos, Oscar M., et al., "Constant linear velocity spiral scanning for near video rate 4D OCT ophthalmic and surgical imaging with isotropic transverse sampling," Biomedical Optics Express, Oct. 1, 2018 (accessible Sep. 28, 2018), p. 5052-5070, vol. 9, issue 10.
Bando, Toshihiro et al., "Attractiveness of Spiral Pattern in Human Vision," Forma, Dec. 2004, pp. 223-232, vol. 19, issue 3.
Larocca, Francesco, et al., "Optimization of confocal scanning laser ophthalmoscope design," Journal of Biomedical Optics, Jul. 17, 2013, 10 pages, vol. 18, issue 7, article 076015.
International Search Report and Written Opinion issued in International Application No. PCT/US2021/045614, mailed Nov. 22, 2021, 8 pages.
Dominik Ziegler et al. "Ideal Scan Path for High-Speed Atomic Force Microscopy" IEEE/ASME Transactions on Mechatronics, Oct. 12, 2016, 11 pages, vol. 22, No. 1.

* cited by examiner

HYBRID SPIRAL SCAN PATTERNS

CROSS-REFERENCE TO RELATED APPLICATIONS

This application is the U.S. National Stage Application of International Application No. PCT/US2021/045614, filed Aug. 11, 2021, which claims the benefit of U.S. Provisional Patent Application Ser. No. 63/063,994, filed Aug. 11, 2020, which are hereby incorporated by reference in their entirety.

STATEMENT REGARDING FEDERALLY SPONSORED RESEARCH

This invention was made with Government support under Federal Grant no. 1R21EY030270-01 awarded by the National Institutes of Health/National Eye Institute. The Federal Government has certain rights to this invention.

BACKGROUND

Many scanning imaging systems, including most existing scanning laser microscopy (SLM), scanning laser ophthalmoscopy (SLO), optical coherence tomography (OCT), and laser scanning confocal microscopy (LSCM) systems, use raster scanning patterns in which image data is acquired by collecting a series of parallel "scan lines" spaced evenly across the region of interest. Although raster scanning simplifies the image processing step to a matter of rearranging acquired image data in a computing device's memory, this comes at the cost of the raster scan pattern being suboptimal in numerous ways, including low scan efficiency (e.g., the percentage of time during a scan when useful data is acquired) caused by dead times during scanner turn-around and poor thermal efficiency (e.g., generating excess waste heat from mechanical scanners).

Depending upon the region of interest (e.g., the anterior or posterior segment of the eye), a spiral scan pattern may be advantageous. Some scanning systems offer non-raster scan patterns, such as Lissajous and spiral scan patterns; however, current applications of these non-raster scan patterns often suffer from bandwidth and/or slew rate limitations of the scanners and under-sampling of the region of interest. For example, angular frequency rates of constant linear velocity (CLV) spirals can exceed the bandwidth of position sensors near a center of a spiral; and for constant angular velocity (CAV) spirals, linear velocities that exceed most imaging systems' capabilities are required at an outside portion of a spiral, resulting in a blurred or low-contrast image and erroneous topographic data in this portion. These non-raster scan patterns also complicate image processing and rendering because the scan data is not arranged in the same rectangular pattern that is easily transferable to a display.

BRIEF SUMMARY

Imaging systems and methods for performing a hybrid spiral scan pattern are provided. The hybrid spiral scan patterns include regions of constant linear velocity spirals and regions of constant angular velocity spirals. Image reconstruction can be carried out by an interpolation of collected data to a raster format such that an image can be produced that is suitable for display. In some cases, it is possible to update the hybrid spiral scan pattern during scanning (e.g., by generating compensating drive signals during the scan) and/or correct the data collected during the scan with position data collected from the position sensors integrated into the scanning system. Certain embodiments can thus provide artifact-free, high-contrast, high-resolution, and high-quality imaging capabilities. These advantages provide broad applicability for performing the hybrid spiral scan pattern in a variety of optical imaging technologies, including all SLM, SLO, OCT, and LSCM technologies, as well as other scanning technologies that utilize energy propagating in the form of waves, including all portions of the electromagnetic spectrum (e.g., radio frequency, far-infrared, near-infrared, visible, ultraviolet, and X-ray), and acoustic energy.

An imaging system for performing a hybrid spiral scan pattern includes a scanner and a scanner controller in communication with the scanner to direct the scanner to perform a hybrid spiral scan pattern. The hybrid spiral scan pattern includes a constant angular velocity (CAV) spiral scan pattern, a constant linear velocity (CLV) spiral scan pattern, and a transition spiral scan pattern. The imaging system can be a light imaging system (e.g., with an optical light source) or an imaging system based on another form of propagating waves (e.g., other non-optical electromagnetic energy or acoustic energy).

In some cases, the transition spiral scan pattern includes a moment when a velocity of the CAV spiral scan pattern is equal to a velocity of the CLV spiral scan pattern. In some cases, the CAV spiral scan pattern is an inner portion of the hybrid spiral scan pattern and the CLV spiral scan pattern is an outer portion of the hybrid spiral scan pattern. In some cases, hybrid spiral scan pattern spirals from a center to an outer portion. In some cases, the hybrid spiral scan pattern further includes a flyback segment to a center. In some cases, the hybrid spiral scan pattern spirals from an outer portion to a center. In some cases, the hybrid spiral scan pattern further includes a flyback segment to an outer portion. In some cases, the hybrid spiral scan pattern alternates between spiraling inwardly and spiraling outwardly with no flyback segments.

An imaging system in the form of a light imaging system for performing a hybrid spiral scan pattern includes a light source, a light scanner positioned to receive light from the light source and direct the light to an object, and a light scanner controller in communication with the light scanner to direct the light scanner to perform a hybrid spiral scan pattern of the light onto the object. The hybrid spiral scan pattern includes a CAV spiral scan pattern, a CLV spiral scan pattern, and a transition spiral scan pattern. In some cases, the light scanner controller is configured to: drive the light scanner in the CAV spiral scan pattern, drive the light scanner in the CLV spiral scan pattern, and perform a shift between the CAV spiral scan pattern and the CLV spiral scan pattern to generate the transition spiral scan pattern. The shift can be from the CAV spiral scan pattern to the CLV spiral scan pattern and vice versa, depending on the particular hybrid spiral scan pattern.

The light imaging system can further include a light detector for capturing light data and an image processor coupled to receive the light data captured by the light detector and produce an image from the light data. In some cases, this light data is the result of diffuse or specular backscattering of the light directed to the object by the light scanner (i.e., a reflective imaging system). In some cases, this light data is the result of the transmission through the object of the light directed to the object by the light scanner (i.e., a transmissive imaging system).

A light imaging system or other imaging system can further include at least one position sensor for detecting actual positions of the scanner during the hybrid spiral scan pattern. The image processor may be coupled to receive position data detected by the at least one position sensor. In some cases, the image produced from the light data uses the position data of the scanner during the hybrid spiral scan pattern to correct the light data. For example, the image processor can determine a difference between an expected position of the scanner according to the hybrid spiral scan pattern and an actual position of the scanner according to the position data detected by the at least one position sensor. The image processor can then correct the light data for image warping caused by the scanner's non-ideal transfer functions based on the determined difference between the expected position of the scanner according to the hybrid spiral scan pattern and the position of the scanner as measured by the at least one position sensor.

In some cases, the position data of the scanner during the hybrid spiral scan pattern is used to adjust or compensate the drive control signals of the scanner controller during the performance of the hybrid spiral scan pattern.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Imaging systems and methods for performing a hybrid spiral scan pattern are provided. The hybrid spiral scan patterns include regions of constant linear velocity spirals and regions of constant angular velocity spirals. Image reconstruction can be carried out by an interpolation of collected data to a raster format such that an image can be produced that is suitable for display. In some cases, it is possible to update the hybrid spiral scan pattern during scanning (e.g., by generating compensating drive signals during the scan) and/or correct the data collected during the scan with position data collected from the position sensors integrated into the scanning system. Certain embodiments can thus provide artifact-free, high-contrast, high-resolution, and high-quality imaging capabilities. These advantages provide broad applicability for performing the hybrid spiral scan pattern in a variety of optical imaging technologies, including all SLM, SLO, OCT, and LSCM technologies, as well as other scanning technologies that utilize energy propagating in the form of waves, including all portions of the electromagnetic spectrum (e.g., radio frequency, far-infrared, near-infrared, visible, ultraviolet, and X-ray), and acoustic energy.

An imaging system for performing a hybrid spiral scan pattern includes a scanner and a scanner controller in communication with the scanner to direct the scanner to perform a hybrid spiral scan pattern. The hybrid spiral scan pattern includes a combination of a constant angular velocity (CAV) spiral scan pattern, a constant linear velocity (CLV) spiral scan pattern, and a transition spiral scan pattern which is a shift between the CAV spiral scan pattern and the CLV spiral scan pattern.

Figure 1A:
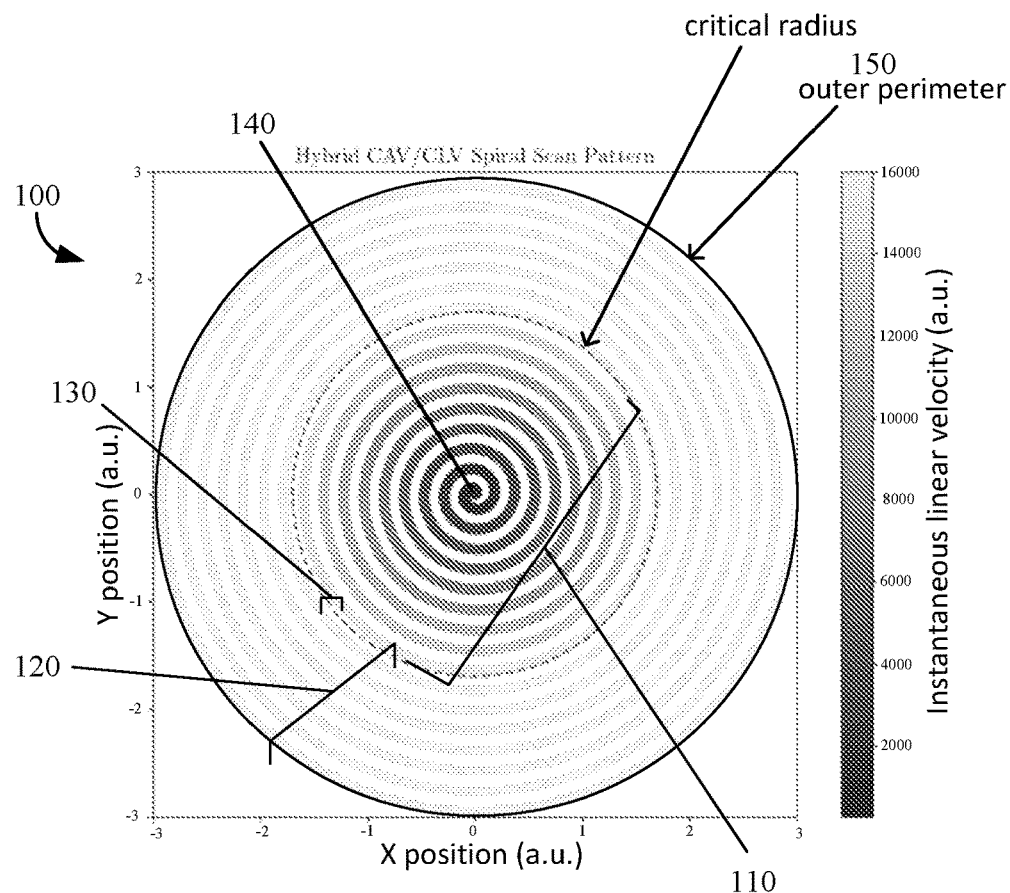
FIG. 1A illustrates the linear velocities of an example hybrid spiral scan pattern.
Figure 1B:
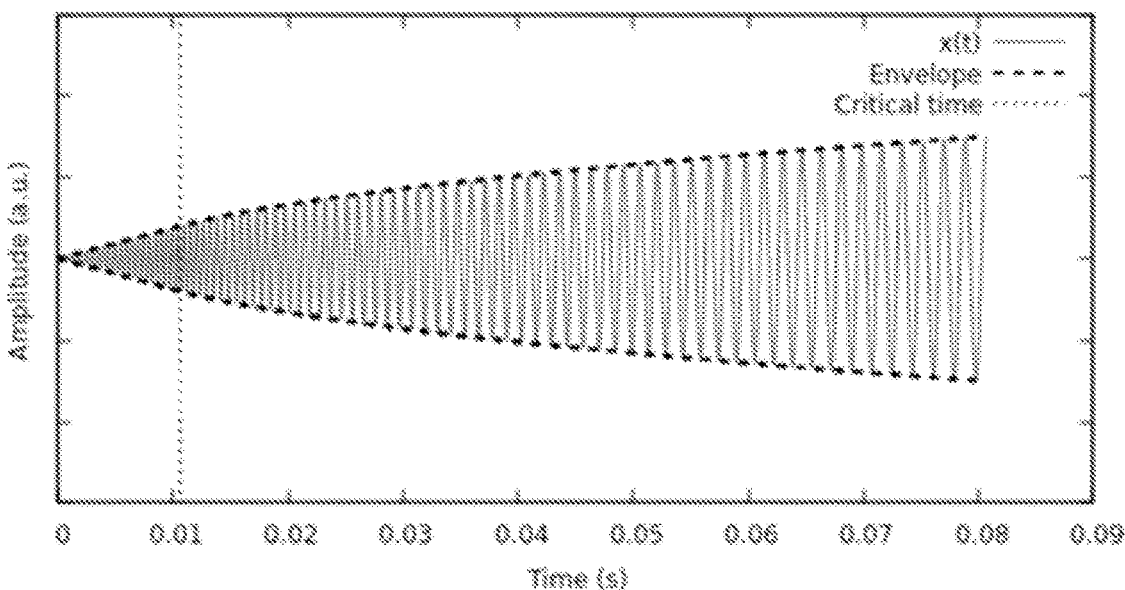
FIG. 1B illustrates a drive waveform of the hybrid spiral scan pattern of FIG. 1A.
Figure 1C:
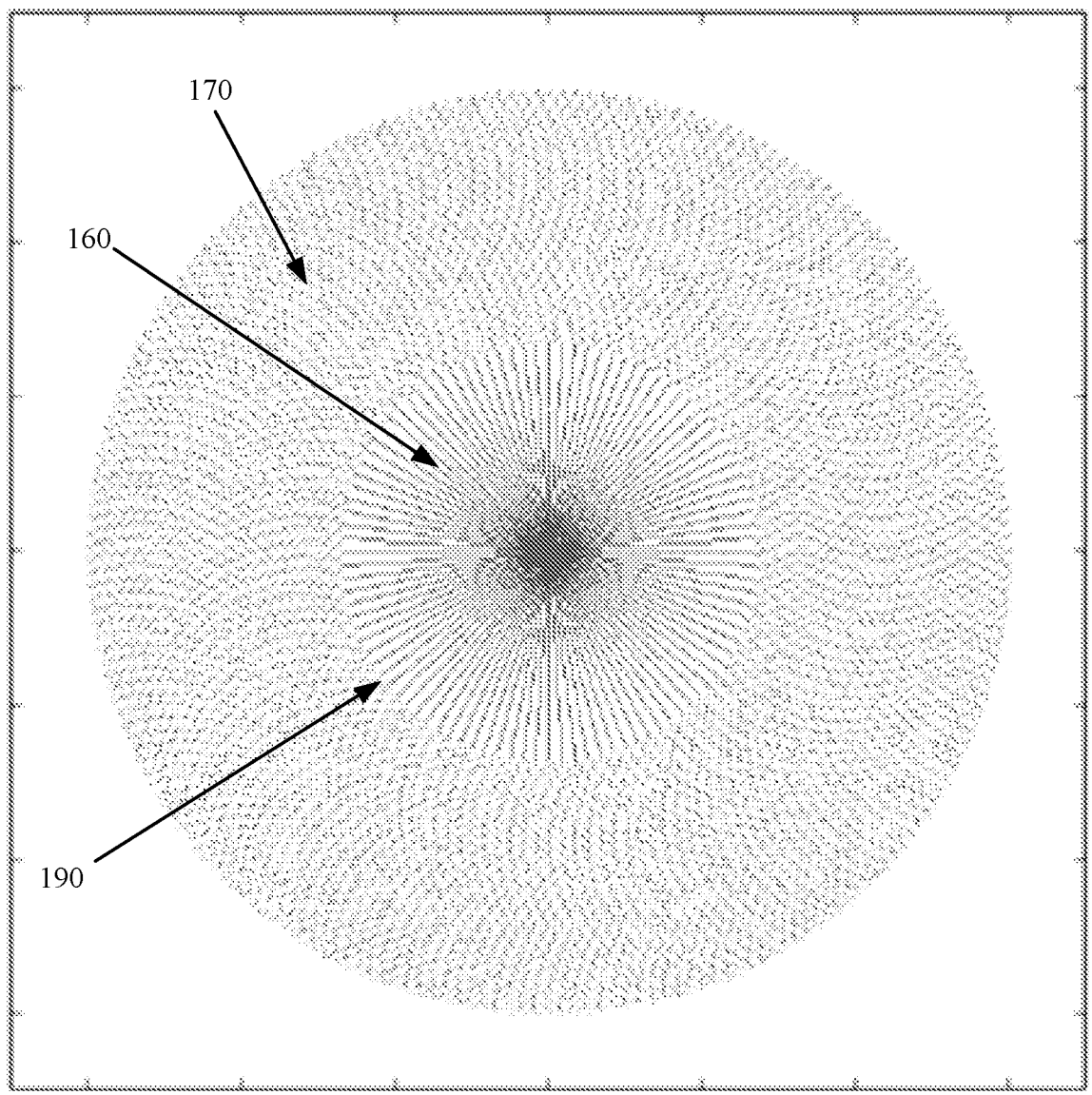
FIG. 1C illustrates a plot of an application of the example hybrid spiral scan pattern of FIG. 1A sampled at equally spaced time intervals.

FIG. 1A illustrates the linear velocities of an example hybrid spiral scan pattern; FIG. 1B illustrates a drive waveform of the hybrid spiral scan pattern of FIG. 1A; and FIG. 1C illustrates a plot of an application of the example hybrid spiral scan pattern of FIG. 1A sampled at equally spaced time intervals.

Referring to FIG. 1A, an example hybrid spiral scan pattern 100 includes a CAV spiral scan pattern 110, a CLV spiral scan pattern 120, and a transition spiral scan pattern 130. In the illustrated example, the CAV spiral scan pattern 110 extends from a center 140 of the hybrid spiral scan pattern and transitions to the CLV spiral scan pattern 120 at the transition spiral scan pattern 130. The CLV spiral scan pattern 120 extends from the transition spiral scan pattern 130 to the outer perimeter 150 of the hybrid spiral scan pattern 100. It should be understood that while the illustrated example shows the CAV spiral scan pattern 110 in a central portion and the CLV spiral scan pattern 120 at an outer portion of the pattern, embodiments are not limited thereto. For example, the CLV and CAV motion may alternate more than once.

As can be seen by the plot of linear velocities, as the CAV spiral scan pattern 110 moves outwardly from the center 140 toward the outer perimeter 150, the linear velocity of the CAV spiral scan pattern 110 increases as the radius of the spiral increases (and if viewing from the outer perimeter 150 to the center 140, the linear velocity of the CAV spiral scan pattern 110 decreases). The CLV spiral scan pattern 120 maintains a constant linear velocity throughout the scanning process.

There is a moment of time (hereinafter, the "critical time") during application of the hybrid spiral scan pattern 100 that the linear velocity of the CAV spiral scan pattern 110 is equal to the linear velocity of the CLV spiral scan pattern 120. While not a requirement for the time at which CAV changes to CLV (or vice versa), this critical time is the most natural time at which to make a transition between the CAV spiral scan pattern and the CLV spiral scan pattern (e.g., the transition spiral scan pattern 130). As shown in the Figure, the radius at which the linear velocity of the CAV spiral scan pattern is equal to the linear velocity of the CLV spiral scan pattern is referred to as the "critical radius".

As a specific example of solving for the critical time mathematically, given a scanning mirror with a bandwidth limit $\omega_L$ and a slew rate limit $v_L$, to parameterize the hybrid spiral scan pattern 100 with a radial pitch of $\Delta r$ and outside radius R, first compute the following:

$$t_c = \frac{2\pi v_L}{\omega_L^2 \Delta r} \quad r_c = \frac{v_L}{\omega_L} \quad \Delta t = t_c - \frac{\pi r_c^2}{v_L \Delta r} \quad t_{end} = \frac{\pi R^2}{v_L \Delta r} + \Delta t$$

Next, an outwardly spiraling hybrid spiral scan pattern can be parameterized as follows:

$$r(t) = \begin{cases} \dfrac{\Delta r \omega_L t}{2\pi} & \text{if } t < t_c \\ \sqrt{\dfrac{v_L \Delta r(t - \Delta t)}{\pi}} & \text{if } t_c \leq t \end{cases}$$

$$\theta(t) = \begin{cases} \omega_L t & \text{if } t < t_c \\ \sqrt{\dfrac{4\pi v_L(t - \Delta t)}{\Delta r}} & \text{if } t_c \leq t \end{cases}$$

Note that $t_c$ is the critical time in these equations. The hybrid spiral scan pattern 100 is CAV for $t < t_c$ and CLV for $t_c \leq t$. Note also that $r(t_c) = r_c$, so that $r_c$ can be thought of as the "critical radius"—the radial coordinate of the spiral when the transition spiral scan pattern 130 occurs. The critical radius is the same for both inward spirals and outward spirals. Indeed, it is possible to generate the hybrid spiral scan pattern 100 starting from the outer perimeter 150 towards the center 140 and starting from the center 140 out towards the perimeter 150 by using the critical radius. Moreover, certain implementations can alternate starting positions and even alternate the direction of the hybrid spiral scan pattern 100 to combine both an outward spiral and an inward spiral.

Referring to FIG. 1B, a drive waveform of a single axis of a scanner performing the example hybrid spiral scan pattern 100 is illustrated. In this example, the hybrid spiral scan pattern begins from the center (e.g., center 140 of hybrid spiral scan pattern 100 shown in FIG. 1A) with CAV and transitions to CLV at the critical time (indicated by dotted line). This waveform may be a drive waveform of a galvanometer that is used as part of the scanner performing the hybrid spiral scan pattern. The galvanometer drive waveforms can be calculated as $x(t) = Kr(t) \cos \theta(t)$, $y(t) = Kr(t) \sin \theta(t)$ for $0 \leq t \leq t_{end}$, where K is the position-to-voltage proportionality constant. These waveforms can be discretized and quantized for digital to analog conversion.

Note that a.u.=arbitrary units. Further note that the drive waveform is a chirped sinusoid modulated with a piecewise envelope function consisting of a linear and then square root portion. The linear portion corresponds to the CAV segment, and the square root portion corresponds to the CLV segment. The switch from the linear to square root envelopes occurs at exactly the critical time $t_c$.

Referring to FIG. 1C, a plot of a hybrid spiral scan pattern 100 on a two-dimensional grid sampled at regular time intervals is illustrated for a specific scenario. As illustrated, the difference between the CAV spiral scan pattern region 160 (which corresponds to CAV spiral scan pattern 110 of FIG. 1A) and the CLV spiral scan pattern region 170 (which corresponds to CLV spiral scan pattern 120 of FIG. 1A) is readily visible, with the transition region 190 clearly identifiable between the two. The radial "spokes" occur in the CAV spiral scan pattern region 160 because the sampling frequency is an integer multiple of the angular frequency COL as selected for this example. It should be understood that other sampling frequencies and other angular frequencies may result in a different plot. The inner portion of the CAV spiral scan pattern region 160 is visibly oversampled due to the decreased linear velocity of the CAV spiral scan pattern nearest the center, which may be desirable in applications in which the center is the region of interest (e.g., in applications in which an eye is the subject being scanned).

As illustrated in FIGS. 1A-1C, the transition spiral scan pattern can include the transition when the linear velocity of the CAV spiral scan pattern 110 is equal to the linear velocity of the CLV spiral scan pattern 120. However, in certain embodiments, the transition spiral scan pattern 130 can occur, for example, where the linear velocity for the CAV spiral scan pattern 110 has a different end value than that used for the CLV spiral scan pattern 120.

In some cases, the CAV spiral scan pattern 110 is an inner portion of the hybrid spiral scan pattern 100 and the CLV spiral scan pattern is an outer portion of the hybrid spiral scan pattern 100. In some cases, the hybrid spiral scan pattern 100 spirals from a center 140 to an outer perimeter 150. In some cases, the hybrid spiral scan pattern 100 includes a flyback segment to a center 140. The flyback segment may be advantageous to re-center a scanning system between multiple/successive outward scans. In some cases, the hybrid spiral scan pattern 100 spirals from an outer perimeter 150 to a center 140. In some cases, the hybrid spiral scan pattern 100 includes a flyback segment from a center 140 to an outer perimeter 150. In some cases, the hybrid spiral scan pattern 100 alternates between spiraling inwardly (e.g., from an outer perimeter 150 to a center 140) and spiraling outwardly (e.g., from a center 140 to an outer perimeter 150) and vice versa. In other words, the hybrid spiral scan pattern 100 may include multiple/successive spirals (e.g., outward then inward or vice versa) until a satisfactory amount of data (e.g., backscattered or transmitted light data) is collected.

As described above, the critical radius can be used for both inward and outward spirals, such that the hybrid spiral scan pattern 100 switches between CAV and CLV as part of the transition spiral scan pattern at the critical radius. In some cases, to repeatedly scan the same area with the hybrid spiral scan pattern 100 following an outward spiral, an inward spiral can be performed (e.g., calculated to be continuous with the already performed outward spiral). This option provides higher scan rates but is subject to the potential of misalignment between the inward and outward spirals. In some cases, to repeatedly scan the same area with the hybrid spiral scan pattern 100 following an outward spiral, a flyback segment may be used to bring the scan back to the center 140, upon which another outward spiral may be performed. In some cases, a flyback segment may be a linear segment. In some cases, the flyback segment is a coarse inward spiral.

Figure 2A:
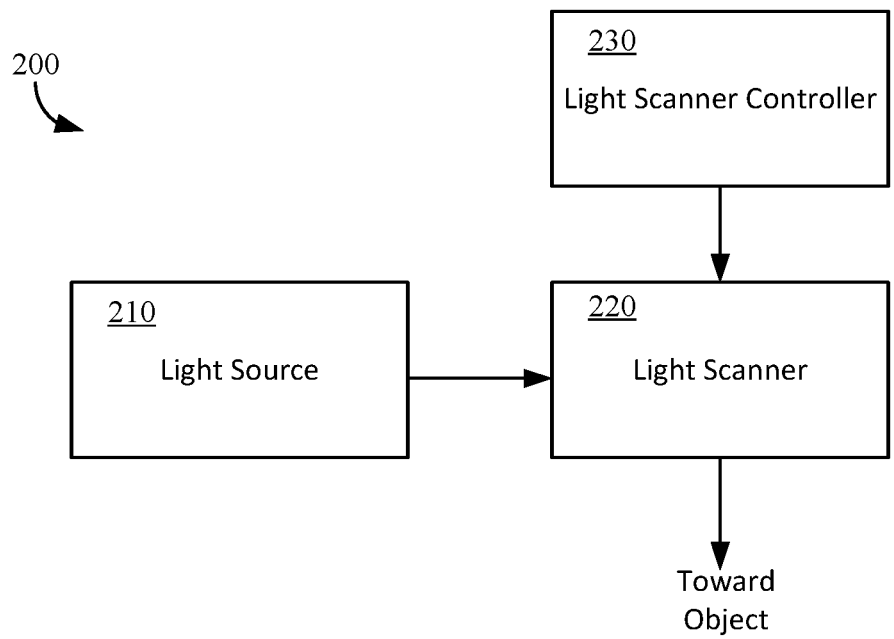
FIGS. 2A and 2B illustrate example system architectures for a light imaging system for performing a hybrid spiral scan pattern.
Figure 2B:
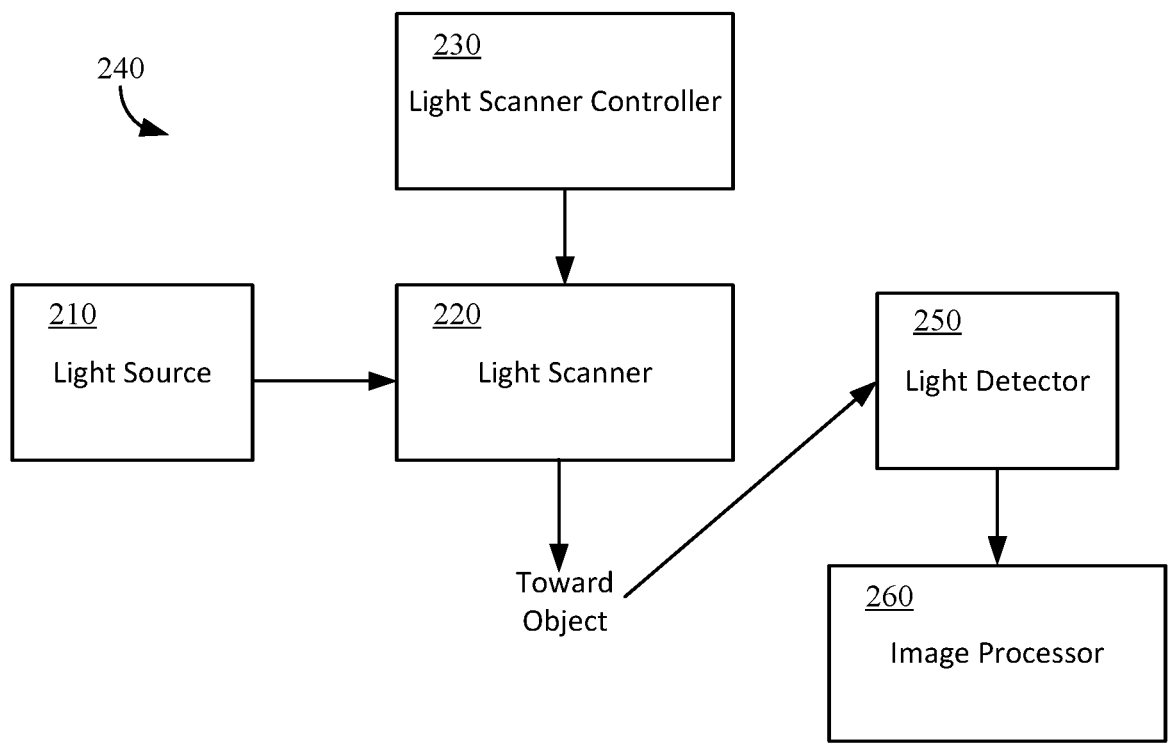

FIGS. 2A and 2B illustrate example system architectures for a light imaging system for performing a hybrid spiral scan pattern. Referring to FIG. 2A, a light imaging system 200 for performing a hybrid spiral scan pattern includes a light source 210, a light scanner 220 positioned to receive light from the light source 210 and direct the light to an object, and a light scanner controller 230 in communication with the light scanner 220 to direct the light scanner 220 to perform a hybrid spiral scan pattern of the light onto the object. The hybrid spiral scan pattern includes a CAV spiral scan pattern, a CLV spiral scan pattern, and a transition spiral scan pattern.

In some cases, the light scanner controller 230 is configured to (e.g., by software and/or hardware elements) drive the light scanner 220 in the CAV spiral scan pattern, drive the light scanner in the CLV spiral scan pattern, and perform a shift between the CAV spiral scan pattern and the CLV spiral scan pattern to generate the transition spiral scan pattern. In some cases, the shift between the CAV spiral scan pattern and the CLV spiral scan pattern is a shift from the CAV spiral scan pattern to the CLV spiral scan pattern. In some cases, the shift between the CAV spiral scan pattern and the CLV spiral scan pattern is a shift from the CLV spiral scan pattern to the CAV spiral scan pattern.

In some cases, the light source 210 includes at least one of a laser, a superluminescent diode (SLD), and a light emitting diode (LED). In some cases, the laser is a diode laser. In some cases, the light source 210 is an incoherent light source or a thermal light source. In some cases, the light source 210 excites fluorescent molecules in the object, which then re-emit photons of a different wavelength. Accordingly, the light, from the light source 210, includes visible light, infrared light, ultraviolet light, or a sub-band therein. In some cases, the light scanner 220 includes at least one of a galvanometer scanning mirror, a microelectromechanical system (MEMS) scanning mirror, a resonant scanning mirror, and a piezo-electric scanning mirror. In some cases, the light scanner 220 further includes one or more translating or rotating refractive elements. In some cases, the one or more translating or rotating refractive elements includes prisms or wedges. In some cases, the light scanner 220 includes at least one of an acousto-optic scanner, an electro-optic scanner, and a holographic scanner.

Referring to FIG. 2B, in a further embodiment, a light imaging system 240 for performing a hybrid spiral scan pattern includes the light source 210, a light scanner 220 positioned to receive light from the light source 210 and direct the light to an object, a light scanner controller 230 in communication with the light scanner 220 to direct the light scanner 220 to perform a hybrid spiral scan pattern of the light onto the object, a light detector 250 for capturing light data backscattered or fluoresced from or transmitted through the object as a result of the light directed to the object by the light scanner 220, and an image processor 260 coupled to receive the light data captured by the light detector 250 and produce an image from the light data. In some cases, this light data is the result of diffuse or specular backscattering of the light directed to the object by the light scanner (i.e., a reflective imaging system). In some cases, this light data is the result of the transmission through the object of the light directed to the object by the light scanner (i.e., a transmissive imaging system). As with the implementation described with respect to FIG. 2A, the hybrid spiral scan pattern that can be performed under control of the scanner controller 230 includes a CAV spiral scan pattern, a CLV spiral scan pattern, and a transition spiral scan pattern.

The light detector 250 can be any suitable detector for detecting the light backscattered or fluoresced from or transmitted through an object as result of light directed to the object by the light source 210. Examples include, but are not limited to an avalanche photodiode, a photomultiplier tube, a p-n photodiode, a p-i-n photodiode, and a thermal detector. In some cases, the light detector may be a two-dimensional image sensor such as a charge-coupled device (CCD) or an active-pixel sensor such as a complementary metal-oxide semiconductor (CMOS) image sensor. In some cases, amplifiers, filters, and other signal conditioning devices may be included as part of light detector 250. The image processor 260 can be a dedicated computing device or a personal computer or other multi-function computing device. Image reconstruction can be carried out at the image processor 260 by an interpolation of collected data to a raster format such that an image can be produced that is suitable for display.

In some cases, it is possible to update the hybrid spiral scan pattern during scanning (e.g., by generating compensating drive signals during the scan) and/or correct the data collected during the scan (for image reconstruction) with position data from the position sensors.

Figure 3A:
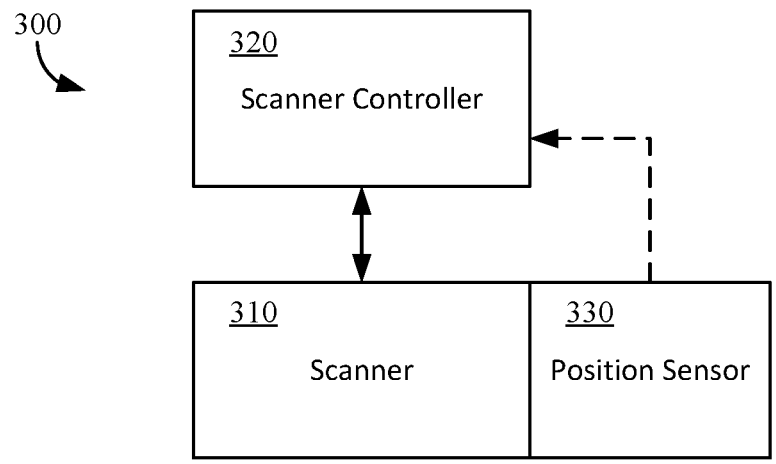
FIGS. 3A and 3B illustrate example system architectures for an imaging system with position sensors for performing a hybrid spiral scan pattern.
Figure 3B:
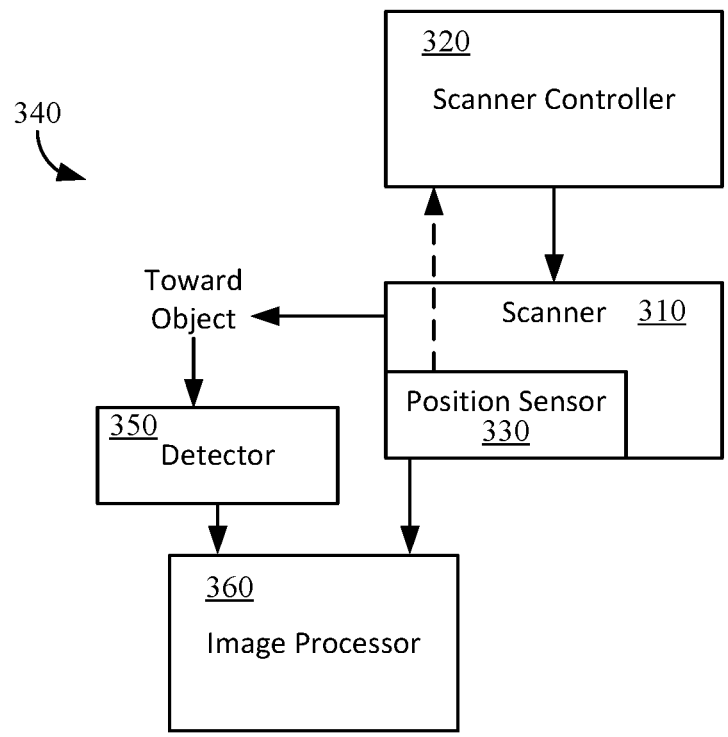

FIGS. 3A and 3B illustrate example system architectures for an imaging system with position sensors for performing a hybrid spiral scan pattern. Referring to FIG. 3A, an imaging system 300 for performing a hybrid spiral scan pattern includes a scanner 310, a scanner controller 320 in communication with the scanner 310 to direct the scanner 310 to perform a hybrid spiral scan pattern, and at least one position sensor 330 for detecting actual positions of the scanner during the hybrid spiral scan pattern. In some cases, the scanner controller 320 is configured to (e.g., by software and/or hardware elements) drive the scanner 310 in a CAV spiral scan pattern, drive the scanner 310 in a CLV spiral scan pattern, and perform a shift between the CAV spiral scan pattern and the CLV spiral scan pattern to generate a transition spiral scan pattern. Indeed, the scanner controller 320 may operate as described with respect to the light scanner controller 230 of FIGS. 2A and 2B. In some cases, the imaging system 300 utilizes a source of energy propagating in the form of waves, including any portion of the electromagnetic spectrum or acoustic energy.

In some cases, the at least one position sensor 330 is directly coupled to the scanner 310. In some cases, the at least one position sensor 330 detects positions of the scanner 310 from a distance. The at least one position sensor 330 may be a capacitive displacement sensor, an eddy-current sensor, a hall effect sensor, an inductive sensor, a laser doppler vibrometer, a linear variable differential transformer (LVDT), a photodiode array, a piezo-electric transducer, a position encoder (e.g., an interferometric encoder and/or laser interferometric encoder), a potentiometer, a proximity sensor, a string potentiometer, and an ultrasonic sensor. The information from the at least one position sensor 330 can, in some cases, be fed back to the scanner controller 320, as described in more detail below. In some cases, the imaging system 300 can be a light imaging system such as described with respect to FIGS. 2A and 2B. However various modalities are also applicable. For example, the system can be suitable for at least one of light energy and sound energy.

Referring to FIG. 3B, in a further embodiment, an imaging system 340 for performing a hybrid spiral scan pattern includes a scanner 310, a scanner controller 320 in communication with the scanner 310 to direct the scanner 310 to perform the hybrid spiral scan pattern, at least one position sensor 330 for detecting actual positions of the scanner 310 during the hybrid spiral scan pattern, a detector 350 for capturing image data reflected, backscattered, or fluoresced from or transmitted through the object as a result of energy directed to the object by the scanner 310, and an image processor 360 coupled to receive position data detected by the at least one position sensor 330 and the image data captured by the detector 350 and produce an image from the image data and the position data. In some cases, the image produced from the image data uses the position data of the scanner 310 during the hybrid spiral scan pattern to correct the image data. The corrected image data can be rasterized for display on a display screen. For example, the image processor 360 can determine the difference between an expected position of the scanner 310 according to the hybrid spiral scan pattern and an actual position of the scanner 310 according to the position data detected by the at least one position sensor 330. The image processor 360 can then correct the image data for image warping caused by the scanner's non-ideal transfer functions based on the determined difference between the expected position of the scanner and the actual position of the scanner.

In some cases, the scanner controller 320 receives the position data from the position sensor(s) 330 and determines a difference between the expected position of the scanner 310 according to the transfer function of the scanner 310 and the position data detected by the at least one position sensor 330. In some cases, the scanner controller 320 determines the aforementioned difference by constructing an approximation of the transfer function, deducing an inversion operator by inverting the approximation of the transfer function, computing a compensated drive waveform for the scanner using the inversion operator, and generating compensating drive signals for the scanner 310 using the compensated drive waveform during the hybrid spiral scan pattern. The scanner controller 320 can then communicate the compensating drive signals to the scanner 310 during the hybrid spiral scan pattern. When the compensating drive signals are executed by the scanner 310, the scanner 310 produces a response that adheres more closely to the intended/expected scan pattern. In some cases, the transfer function is theoretically or empirically determined.

As a specific example, a detector in a reflective SLM system samples the intensity of backscattered light at regular intervals, giving a discrete-time series I[t] for t∈{$t_0$ ... $t_{end}$}. The image processing can transform this one-dimensional time series into a two-dimensional raster image, suitable for display on computer screens, or storage into a conventional image format such as TIFF, JPEG, or PNG. According to an example implementation, each intensity sample I[t] is associated with a corresponding (x, y) position describing the location on the sample where this intensity sample was taken. However, this is complicated by the transfer function of real scanning systems being non-ideal: given a drive waveform x(t) in one axis, the response waveform x'(t) is related to x(t) by some operator F such that x'(t)=F (x(t)). The transfer function F is usually nonlinear, but can contain approximately linear regions. The described position sensors 330 can be used to facilitate methods for correcting image warping caused by the non-ideal scanning system transfer functions.

In some cases, these methods include inverting the scanning system's transfer function F to deduce an inversion operator G, then generating compensating drive signals G(x(t)) and G(y(t)) such that F (G(x(t)))≈x(t) and F (G(y(t)))≈y(t). This inversion may be facilitated by measuring the scanning system responses, via the position sensors 330, to input drive signals from scanner controller 320, as well as by knowledge of the dynamics of the particular scanner (e.g., galvanometer scanning mirror technology). Machine learning methods, such as convolutional neural networks (CNNs), may be used to deduce G. In some cases, these methods include driving the scanning system with the unmodified waveforms x(t) and y(t) and simultaneously using the position sensor signals to record the response of the system as x'(t) and y'(t).

In any case, the result is a pair of response waveforms x'(t) and y'(t). With these waveforms, each I[t] can be associated with the corresponding position (x'(t), y'(t)) for all t∈ {$t_0$ ... $t_{end}$}. Taken as a whole, these associations can be rasterized by forming a two-dimensional raster image $A_{ij}$ suitable for display or saving to a conventional image format. To accomplish this, conventional graphics processing unit (GPU) technology, which is capable of performing this rasterization in real time, can be used at the image processor 360. In some cases, inverse distance-weighted interpolation methods may be used to rasterize the image data.

Figure 4:
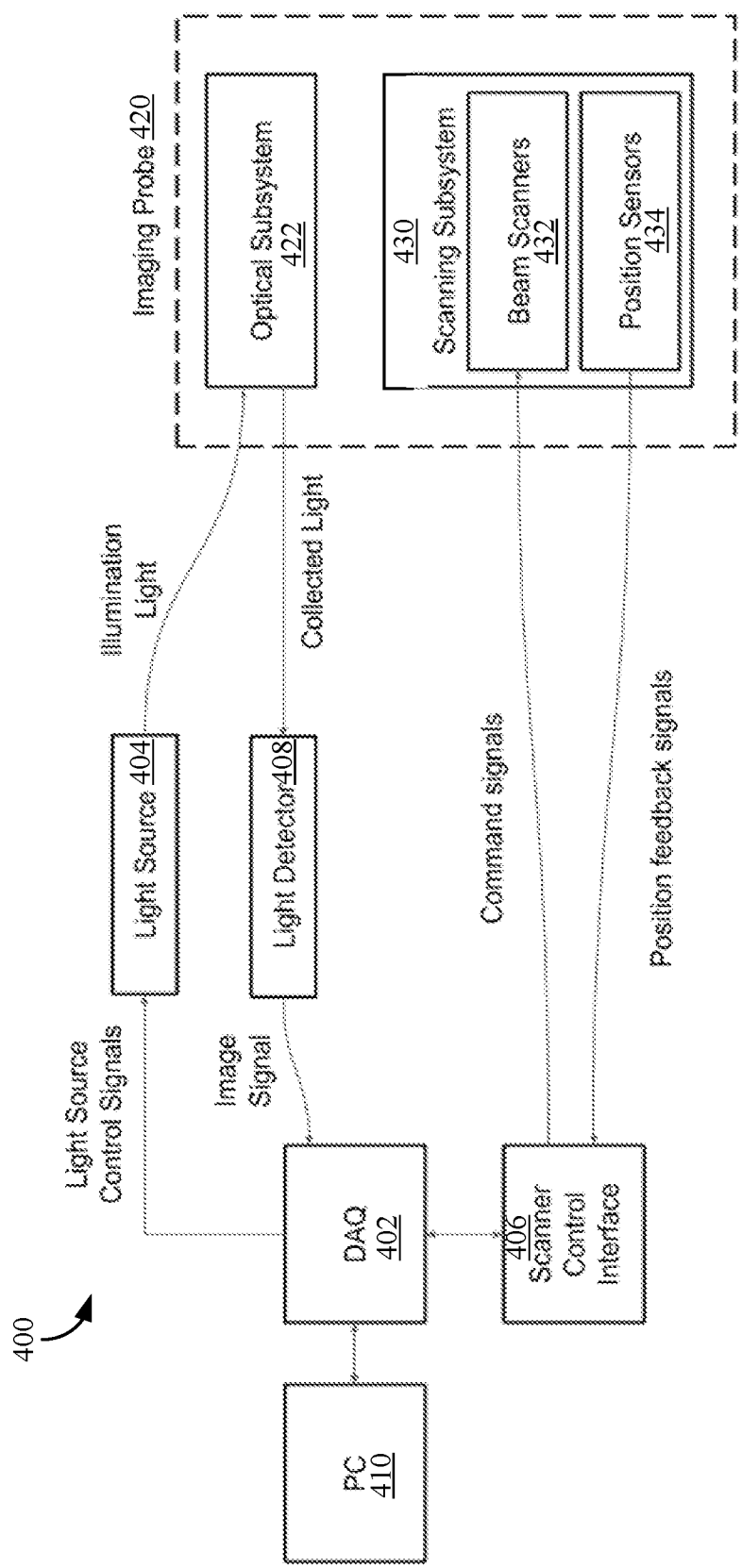
FIG. 4 illustrates a specific embodiment of a system architecture for a light imaging system for performing a hybrid spiral scan pattern.
Figure 5:
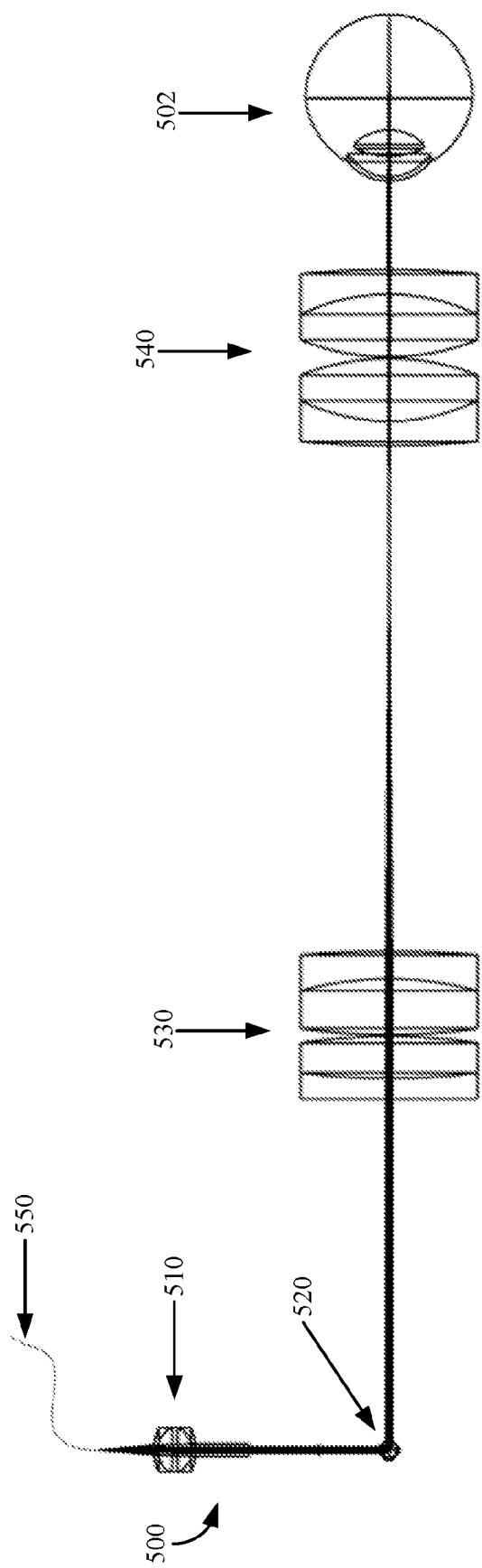
FIG. 5 illustrates a specific embodiment of an optical design for performing a hybrid spiral scan pattern to an eye.

FIG. 4 illustrates a specific embodiment of a system architecture for a light imaging system for performing a hybrid spiral scan pattern. FIG. 5 illustrates a specific embodiment of an optical design for performing a hybrid spiral scan pattern to image the posterior segment of an eye. It should be understood that these are specific embodiments of an optical design and of a system architecture for a light imaging system for performing a hybrid spiral scan pattern; in other embodiments, more or fewer features may be included in an optical design and/or a light imaging system for performing a hybrid spiral scan pattern. Referring to FIG. 4, a light imaging system 400 for performing a hybrid spiral scan pattern includes data acquisition hardware (DAQ) 402 in communication with a light source 404 to provide light source control signals to the light source 404. In some cases, the light source control signals include commands to the light source 404 to switch on and off, to produce specific wavelengths of light (e.g., by turning one or more emitters that produce specific wavelengths of light), or to provide specific intensities of light by intensity modulation (e.g., modulating the intensity of light illuminating the CAV region of the hybrid spiral scan pattern, where linear velocities are low, to provide uniform time-weighted illumination of the object). The light source 404 provides light to an optical subsystem 422 of an imaging probe 420. The light then traverses through the imaging probe 420 to a scanning subsystem 430 and back again to the optical subsystem 422 where the light is directed to a subject.

Specifically, beam scanners 432 of the scanning subsystem 430 are in communication to receive command signals from a scanner control interface 406 to direct the light to a subject in a hybrid spiral scan pattern. In some cases, the beams scanners 432 are galvanometer scanners. Position sensors 434 of the scanning subsystem 430 are in communication with the scanner control interface 406 (which, in turn, is in communication with the DAQ 402) to provide position data collected from the position of the beam scanners 432 during the hybrid spiral scan pattern to the DAQ 402. In some cases, the scanner control interface 406 may be included within the imaging probe 420. In some cases, the scanner control interface 406 may be included with the DAQ 402. In some cases, the imaging probe 420 may contain any of the features illustrated in the light imaging system 400.

In some cases, the imaging probe 420 may include an optical design for confocally imaging the posterior segment of the eye as illustrated in FIG. 5. Referring to FIG. 5, an optical design 500 for performing the hybrid spiral scan pattern includes a collimating lens 510 (e.g., of the optical subsystem 422 of FIG. 4) that receives light from a light source through an optical fiber 550. In some cases, the collimating lens is an achromatic triplet collimator, including, but not limited to, a Hastings triplet. Next, light from the collimating lens 510 reaches the scanning system 520 (e.g., scanning subsystem 430 of FIG. 4), which directs the light according to the hybrid spiral scan pattern. In some cases, the light from the collimating lens 510 is first passed through an electrically tunable liquid lens to provide focus adjustment before reaching the scanning system 520. In some cases, the scanning system 520 includes galvanometers (e.g., beam scanners 432 of FIG. 4). In some cases, position sensors (e.g., position sensors 434 of FIG. 4) are included at the galvanometers. The light is directed by the scanning system 520 to the scan lens 530, and from the scan lens 530 to an objective lens 540 (e.g., of the optical subsystem 422 of FIG. 4). In some cases, one or more of the scan lens 530 and objective lens 540 may include a Plossl eyepiece consisting of two achromatic doublets, or an aspheric lens. From the objective lens 540, the light is directed to the eye 502, where it enters the pupil and is focused onto the retina. Light reflected from the retina follows the same optical path in reverse, back to the light detector (i.e., the optical subsystem 422 of FIG. 4) via the optical fiber 550.

In some cases, the scanning system 520/scanner control interface 406 includes instructions stored within memory that are performed by a processor to implement the hybrid spiral scan pattern (e.g., as described with respect to FIGS. 1A-1C). Alternatively, or in addition, the functionality for performing the hybrid spiral scan pattern described herein (e.g., as described with respect to FIGS. 1A-1C) can be performed, at least in part, by one or more hardware logic components of the scanning system 520/DAQ 402. For example, and without limitation, illustrative types of hardware logic components that can be used include microcontrollers, field-programmable gate arrays (FPGAs), application-specific integrated circuits (ASICs), application-specific standard products (ASSPs), system-on-a-chip systems (SOCs), complex programmable logic devices (CPLDs), etc.

Referring back to FIG. 4, light that is backscattered or fluoresced from or transmitted through an object (e.g., from the light that is directed to the eye 502 in FIG. 5) is detected and/or collected by a light detector 408. Light image data that is collected/detected by the light detector 408 is then sent to the DAQ 402 for image processing. In some cases, the DAQ 402 may send the light image data to a computer (PC) 410 for image processing. In some cases, the PC 410 includes an image processor to produce an image from the light image data. The image processor can include a central processing unit (CPU), a graphics processing unit (GPU), an application specific processor, or logic devices, as well as any other type of processing device, combinations, or variations thereof that execute software and/or perform logic operations to produce an image for display. The image processor may rasterize the light image data to produce an image on a display connected to the PC 410.

The PC 410 may also include one or more storage resources including storage (e.g., to store the light image data and/or position information). The one or more storage resources can include volatile and non-volatile memories, removable and non-removable media implemented in any method or technology for storage of information, such as computer readable instructions, data structures, program modules, or other data. Examples of storage resources include storage devices in the form of random access memory, read only memory, magnetic disks, optical disks, CDs, DVDs, flash memory, magnetic cassettes, magnetic tape, magnetic disk storage or other magnetic storage devices, or any other suitable storage media. In no case is a storage resource implementing the storage a transitory propagated signal. Indeed, as used herein "storage media" do not consist of transitory, propagating waves. Instead, "storage media" refers to non-transitory media. Storage can store instructions for the processes carried out by the imaging system, including instructions for performing the hybrid spiral scan pattern, collection of position data, and collection of the image data. It is further contemplated that said instructions can be stored at any suitable computer-readable storage medium for execution by any imaging system. Again, it should be understood that "computer-readable storage medium" does not consist of transitory propagating signals.

In some cases, the PC 410 may be remote from the DAQ 402 (e.g., on-site, off-site, or cloud-based) to securely receive the light image data from the DAQ 402. In some cases, communications interfaces for sending/receiving the light image data can include a network interface for coupling to the Internet or cellular service (e.g., for communicating with a service tied to a mobile application on a mobile device) and/or a short-range interface (near field, wide band, Bluetooth®, or other common communication protocols) that can be used to communicate wirelessly with nearby devices. In some cases, the communications interfaces can include direct interfaces for particular sensors or general interfaces such as USB, Ethernet, or FireWire.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A light imaging system for performing a hybrid spiral scan pattern, comprising:
   a light source;
   a light scanner positioned to receive light from the light source and direct the light to an object; and
   a light scanner controller in communication with the light scanner to direct the light scanner to perform a hybrid spiral scan pattern of the light onto the object, wherein the hybrid spiral scan pattern comprises a constant angular velocity (CAV) spiral scan pattern, a constant linear velocity (CLV) spiral scan pattern, and a transition spiral scan pattern.

2. The light imaging system of claim 1, wherein the light scanner controller is configured to:
   drive the light scanner in the CAV spiral scan pattern;
   drive the light scanner in the CLV spiral scan pattern; and
   perform a shift between the CAV spiral scan pattern and the CLV spiral scan pattern to generate the transition spiral scan pattern.

3. The light imaging system of claim 2, wherein the shift between the CAV spiral scan pattern and the CLV spiral scan pattern is a shift from the CAV spiral scan pattern to the CLV spiral scan pattern.

4. The light imaging system of claim 2, wherein the shift between the CAV spiral scan pattern and the CLV spiral scan pattern is a shift from the CLV spiral scan pattern to the CAV spiral scan pattern.

5. The light imaging system of claim 1, wherein the transition spiral scan pattern comprises a moment of time when a linear velocity of the CAV spiral scan pattern is equal to a linear velocity of the CLV spiral scan pattern.

6. The light imaging system of claim 1, wherein the CAV spiral scan pattern is an inner portion of the hybrid spiral scan pattern and the CLV spiral scan pattern is an outer portion of the hybrid spiral scan pattern.

7. The light imaging system of claim 1, wherein the hybrid spiral scan pattern spirals from a center to an outer perimeter.

8. The light imaging system of claim 6, wherein the hybrid spiral scan pattern further comprises a flyback segment to a center.

9. The light imaging system of claim 1, wherein the hybrid spiral scan pattern spirals from an outer perimeter to a center.

10. The light imaging system of claim 9, wherein the hybrid spiral scan pattern further comprises a flyback segment from a center to an outer perimeter.

11. The light imaging system of claim 1, wherein the hybrid spiral scan pattern alternates between spiraling inwardly and spiraling outwardly.

12. The light imaging system of claim 1, further comprising:
- a light detector for capturing light data backscattered from or transmitted through the object as a result of the light directed to the object by the light scanner; and
- an image processor coupled to receive the light data captured by the light detector and produce an image from the light data.

13. The light imaging system of claim 12, further comprising at least one position sensor for detecting actual positions of the light scanner during the hybrid spiral scan pattern, wherein the image processor is coupled to receive position data detected by the at least one position sensor and produce the image from the light data and the position data.

14. The light imaging system of claim 13, wherein the image processor produces the image from the light data and the position data by:
- correcting the light data using the actual positions of light scanner during the hybrid spiral scan pattern as detected by the at least one position sensor; and
- rasterizing the corrected light data for display on a display screen.

15. The light imaging system of claim 12, wherein the light detector comprises at least one of an avalanche photodiode, a photomultiplier tube, a p-n photodiode, a p-i-n photodiode, a thermal detector, and a two-dimensional image sensor.

16. The light imaging system of claim 15, wherein the two-dimensional image sensor is a charge-coupled device (CCD) or an active-pixel sensor.

17. The light imaging system of claim 16, wherein the active-pixel sensor is a complementary metal-oxide semiconductor (CMOS) image sensor.

18. The light imaging system of claim 1, wherein the light scanner comprises at least one of a galvanometer, a MEMS scanning mirror, a resonant scanning mirror, and a piezoelectric scanning mirror.

19. The light imaging system of claim 18, wherein the light scanner further comprises one or more translating or rotating refractive elements.

20. The light imaging system of claim 19, wherein the one or more translating or rotating refractive elements comprise prisms or wedges.

21. The light imaging system of claim 18, wherein the light scanner further comprises at least one of an acousto-optic scanner, an electro-optic scanner, and a holographic scanner.

22. The light imaging system of claim 1, wherein the light source comprises at least one of a laser, a superluminescent diode (SLD), and a light emitting diode (LED).

23. The light imaging system of claim 1, wherein the light source is an incoherent light source or a thermal light source.

24. An imaging system for performing a hybrid spiral scan pattern, comprising:
- a scanner;
- a scanner controller in communication with the scanner to direct the scanner to perform a hybrid spiral scan pattern, wherein the hybrid spiral scan pattern comprises a constant angular velocity (CAV) spiral scan pattern, a constant linear velocity (CLV) spiral scan pattern, and a transition spiral scan pattern; and
- at least one position sensor for detecting actual positions of the scanner during the hybrid spiral scan pattern.

25. The imaging system of claim 24, further comprising an image processor coupled to receive position data detected by the at least one position sensor.

26. The imaging system of claim 25, further comprising a detector for capturing image data from energy directed to an object by the scanner, wherein the image processor is coupled to receive the image data captured by the detector and produce an image from the image data and the position data.

27. The imaging system of claim 26, wherein the image processor produces the image from the image data and the position data by:
- correcting the image data using the position data of the scanner during the hybrid spiral scan pattern as detected by the at least one position sensor; and
- rasterizing the corrected image data for display on a display screen.

28. The imaging system of claim 26, wherein the energy comprises at least one of light energy and sound energy.

29. The imaging system of claim 26, wherein the image processor determines a difference between an expected position of the scanner according to the hybrid spiral scan pattern and an actual position of the scanner according to the position data detected by the at least one position sensor.

30. The imaging system of claim 29, wherein the image processor corrects the image data for image warping based on the determined difference between the expected position of the scanner and the actual position of the scanner.

31. The imaging system of claim 29, wherein the expected position of the scanner is based on a transfer function for the scanner.

32. The imaging system of claim 24, wherein the scanner controller is coupled to receive position data detected by the at least one position sensor and determines a difference between an expected position of the scanner according to a transfer function for the scanner and an actual position of the scanner according to the position data detected by the at least one position sensor.

33. The imaging system of claim 32, wherein the scanner controller determines the difference between the expected position of the scanner and the actual position of the scanner by:
- constructing an approximation of the transfer function;
- deducing an inversion operator by inverting the approximation of the transfer function;
- computing a compensated drive waveform for the scanner using the inversion operator; and
- generating compensating drive signals for the scanner using the compensated drive waveform during the hybrid spiral scan pattern.

34. The imaging system of claim 33, wherein the scanner controller further communicates the compensating drive signals to the scanner during the hybrid spiral scan pattern.

35. The imaging system of claim 24, wherein the scanner controller is configured to:
- drive the scanner in the CAV spiral scan pattern;
- drive the scanner in the CLV spiral scan pattern; and
- perform a shift between the CAV spiral scan pattern and the CLV spiral scan pattern to generate the transition spiral scan pattern.

* * * * *